United States Patent [19]
Matsuda

[11] Patent Number: 5,179,502
[45] Date of Patent: Jan. 12, 1993

[54] POCKET-SIZE ELECTRONIC DEVICE
[75] Inventor: Masaru Matsuda, Tenri, Japan
[73] Assignee: Sharp Kabushiki Kaisha, Osaka, Japan
[21] Appl. No.: 731,777
[22] Filed: Jul. 18, 1991
[30] Foreign Application Priority Data
   Jul. 20, 1990 [JP] Japan ................ 2-193557
[51] Int. Cl.⁵ ............... H05K 7/00; G06F 15/02
[52] U.S. Cl. .................... 361/392; 361/380;
   361/394; 361/399; 361/415; 364/705.03;
   364/705.06; 235/61 R; 235/61 A
[58] Field of Search ............ 361/380, 392, 394, 399,
   361/415; 364/705.02, 705.03, 705.06; 235/61 R,
   61 A

[56] References Cited
U.S. PATENT DOCUMENTS
4,075,702  2/1978  Davies ................ 364/705
4,724,527  2/1988  Nishimura et al. ......... 364/705

FOREIGN PATENT DOCUMENTS
55-112747  8/1980  Japan .
1-076645   5/1989  Japan .
2-104455   8/1990  Japan .

Primary Examiner—Leo P. Picard
Assistant Examiner—Young S. Whang
Attorney, Agent, or Firm—Nixon & Vanderhye

[57] ABSTRACT

A pocket-size electronic device adapted for use as an electronic organizer which includes a casing having a coordinate input section of a tablet type, a telescopic touch pen for writing in the coordinate input section, a cover hinged to the casing by means of an upper hinge and a lower hinge disposed at a distance from each other so as to cover the coordinate input section, a touch pen holder disposed between the upper hinge and the lower hinge, the touch pen holder having a first holder member and a second holder member, an end of the touch pen being retained by the first holder and the other end being retained by the second holder.

7 Claims, 5 Drawing Sheets

PRIOR ART

POCKET-SIZE ELECTRONIC DEVICE

BACKGROUND OF THE INVENTION

1. Field of the Invention

The present invention relates to a pocket-size electronic device adapted for use as an electronic organizer, capable of allowing signals to be written in by means of a touch pen, thereby enabling the user to remember addresses, schedules, dates of meetings, etc.

2. Description of the Prior Art

Figure 7:
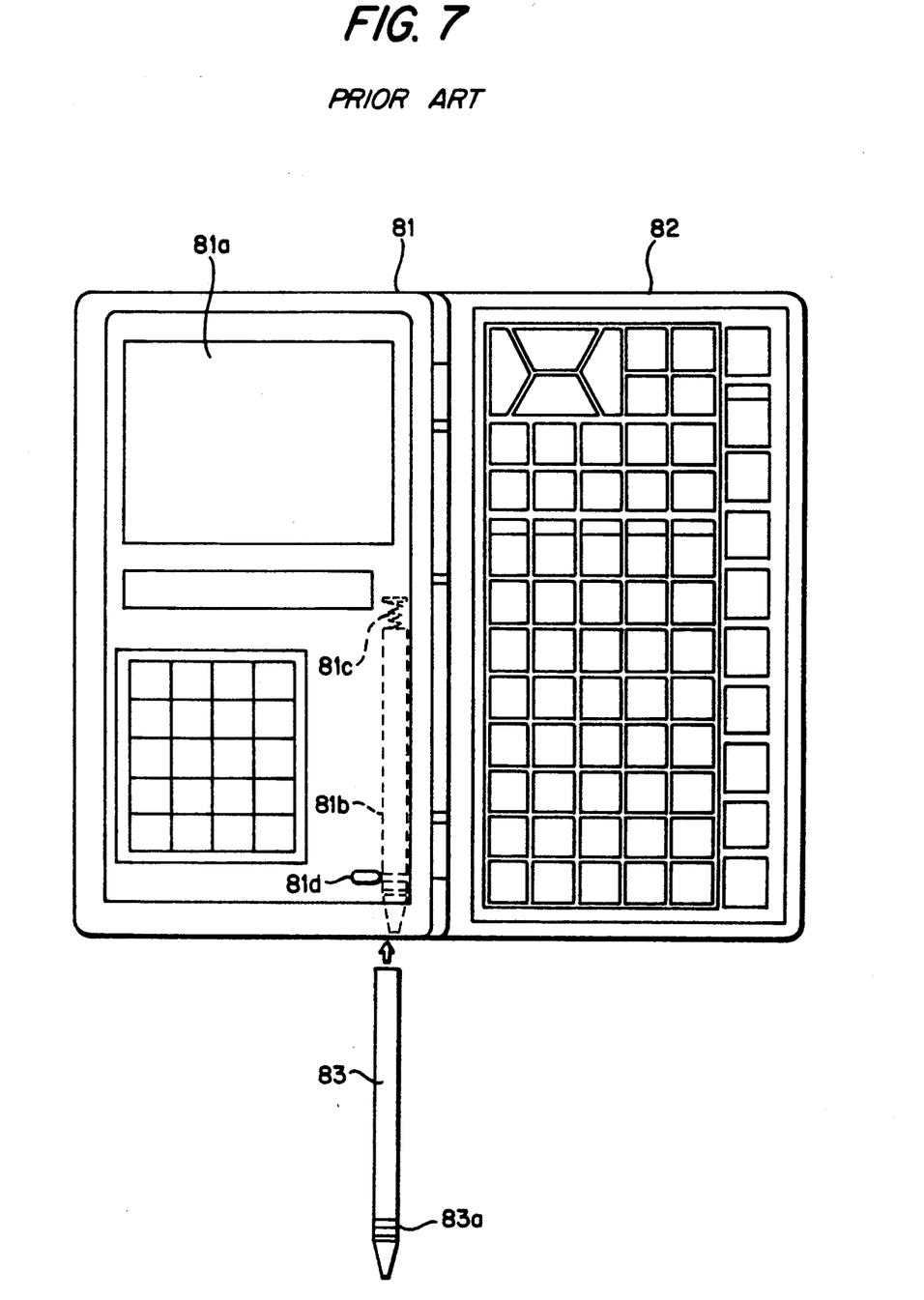
FIG. 7 is a prior art electronic device.

In recent years, pocket-size electronic devices are known in which addresses, names and schedules are written in as signals. FIG. 7 shows a typical electronic device in common use, which will be described as the background:

The illustrated electronic device includes a casing 81 having a transparent coordinate input section 81a of a tablet shape, a cover 82 hinged to the casing 81, and a touch pen 83 which enables the user to write data in the coordinate input section 81a.

This type of electronic device allows a variety of data to be input for memory by means of a touch pen, and a memory card containing application programs is fixed in the casing 81.

The touch pen 83 is kept in contact with the coordinate input section 81a and its tip portion is slided thereon. A predetermined image is input by electronically catching the trace of the pen.

The touch pen 83 is a tool separate from the casing 81, and when it not used, is housed in an accommodation hole 81b made in the side of the casing 81. The touch pen 83 is inserted shank first as indicated by the arrow. The accommodation hole 81b houses a spring 81c at the bottom against which the touch pen 83 is inserted. The touch pen 83 is provided with a ring-shaped recess 83a in which a retainer 81d is engaged, wherein the retainer 81d is located near the entrance of the accommodation hole 81b. When the touch pen 83 is inserted in the accommodation hole 81b, it is slightly protruded through the accommodation hole 81b. The touch pen 83 is retained in the accommodation hole 81b by engagement with the retainer 81d in the ring-shaped recess. By pushing the touch pen 83, the retainer 81d is disengaged from the ring-shaped recess 83a. The touch pen 83 is adjusted so that it is projected by half the entire length under the action of the spring 81c. In this way the touch pen 83 is ready to be picked up.

When the accommodation hole 81b is made in the casing 81, a special space is required. This increases the size of the electronic device. In order to perform efficient input operations, the touch pen 83 is desirably long, and therefore, the accommodation hole 81b needs to be large enough to accommodate the touch pen 83. As a result, the device is likely to become larger than pocket-sized.

SUMMARY OF THE INVENTION

The pocket-size electronic device of this invention, which overcomes the above-discussed and numerous other disadvantages and deficiencies of the prior art, comprises a casing including a coordinate input section of a tablet type, a telescopic touch pen for inputting signals to the coordinate input section, a cover hinged to the casing by means of an upper hinge and a lower hinge disposed at a distance from each other, a touch pen holder disposed in the space between the upper hinge and the lower hinge, the touch pen holder comprising a first holder member and a second holder member, one end of the touch pen being retained by the first holder and the other end being retained by the second holder.

In a preferred embodiment, the first holder member comprises a tapered face capable of being kept in full contact with the surface of the casing.

In a preferred embodiment, the casing comprises a liquid crystal display device.

In a preferred embodiment, the pocket-size electronic device is an electronic organizer.

Thus, the invention described herein makes possible the objective of providing a pocket-size electronic device equipped with a telescopic touch pen capable of efficient input operation.

BRIEF DESCRIPTION OF THE DRAWINGS

This invention may be better understood and its numerous objects and advantages will become apparent to those skilled in the art by reference to the accompanying drawings as follows:

FIG. 2b is a schematic view exemplifying the action of the touch pen shown in FIG. 2a;

FIG. 3 is a perspective view showing the main portion of the pocket-size electronic device of FIG. 1;

FIG. 4a is a fragmentary view on an enlarged scale showing the main portion of FIG. 3;

FIG. 4b is a cross-section taken along the line B—B in FIG. 4a;

FIG. 5a is a side view showing the touch pen of FIG. 1;

FIG. 5b is a schematic view exemplifying the operation of the touch pen shown in FIG. 1;

DESCRIPTION OF THE PREFERRED EMBODIMENTS

The pocket-size electronic device according to the present invention is adapted for use as an electronic organizer which can be operated according to the input operation of a plurality of input key switches with the help of the memory contents and memory programs stored in a memory built in the body of the electronic organizer and/or the detachable external memory card 60.

Figure 1:
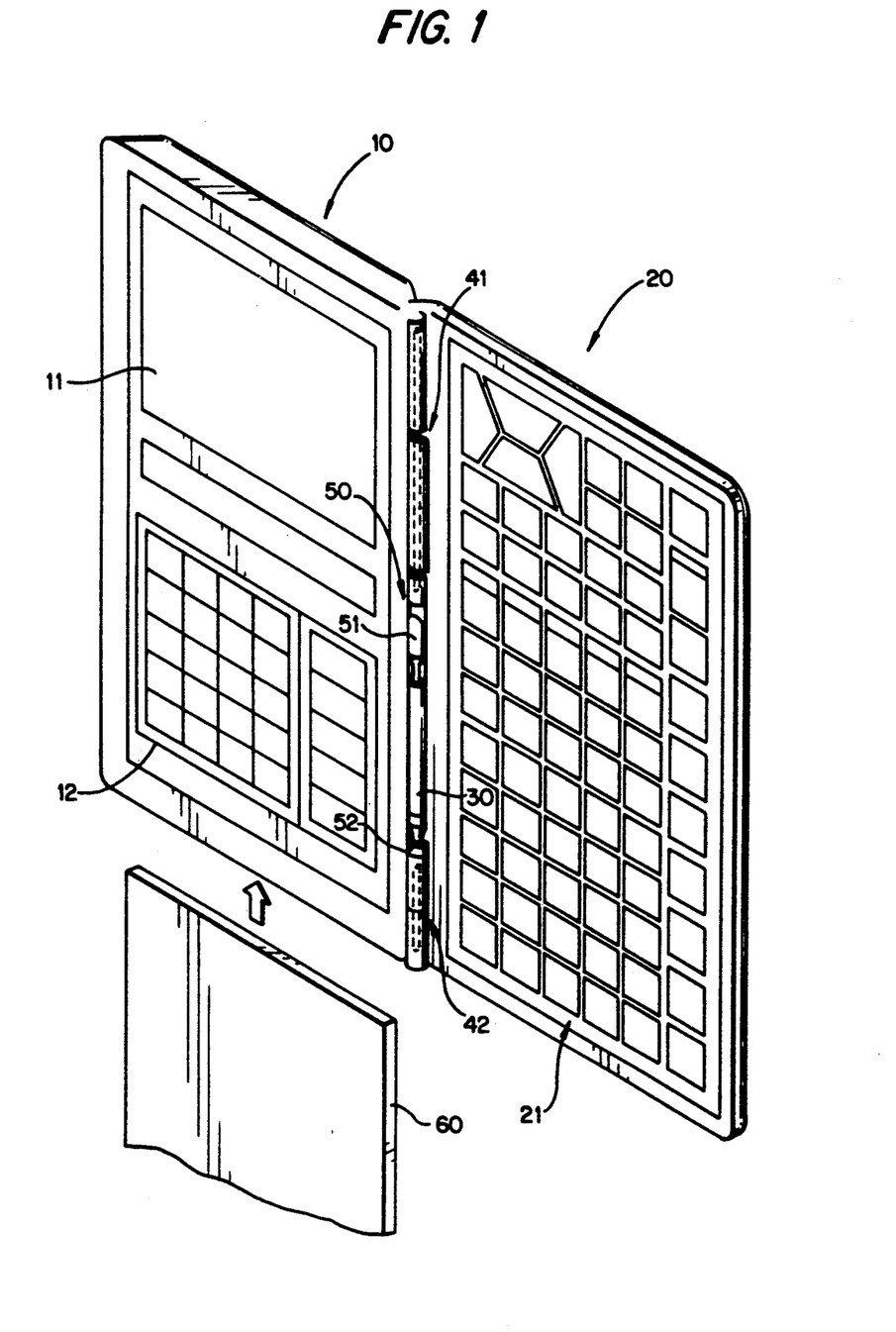
FIG. 1 is a perspective view showing a pocket-size electronic device according to the present invention.

Referring to FIG. 1, a typical example of an electronic organizer embodying the present invention will be described:

The illustrated electronic organizer includes a casing 10, a cover 20 hinged to the casing 10 by means of hinges 41 and 42, and a touch pen 30 releasably mounted on the casing 10. The casing 10 is a rectangular flat tray type.

The casing 10 is provided with a transparent coordinate input section 11 of a tablet type on the inside surface thereof, any means such as a slot (not shown) for accommodating a memory card 60 on the bottom side, and a touch pen 30. The memory card 60 includes a ROM (read-only memory) which stores versatile programs.

Figure 6:
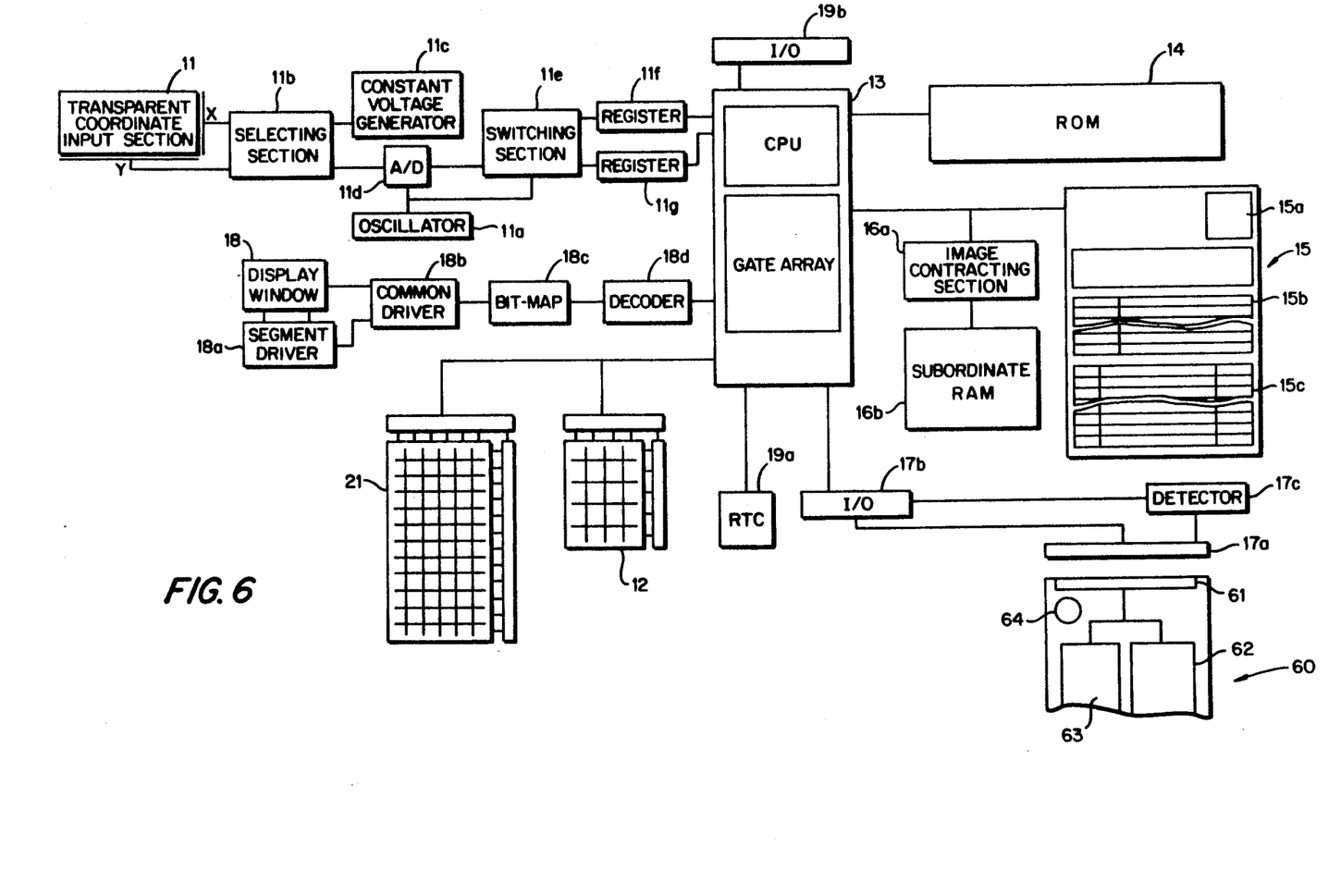
FIG. 6 is a block diagram incorporated in the pocket-size electronic device according to the present invention.

The transparent coordinate input section 11 includes a pair of transparent sheets spaced by a spacer, each sheet having a transparent electroconductive layer on their inner surface so as to enable both layers to face each other. The spacer, designed to prevent the two layers from coming into contact with each other, is formed by printing either on both sheets or just one of them. The input section 11 is overlaid on a display window 18 (FIG. 6) accommodated in the casing 10. The display is visually observed through the transparent coordinate input section 11. Coordinates inscribed by the touch pen 30 in the input sections 11 are successively input to a control section 13 (FIG. 6).

The casing 10 also includes a transparent input key section 12 disposed beside the coordinate input section 11. The transparent input key section 12 corresponds to the input display of the memory card 60; for example, twenty input keys (4×5). The input display of the memory card 60 can be visually observed through the transparent input key section 12. When the input key section 12 corresponding to a predetermined input display is oppressed, the item displayed in the input display section is input to the memory card 60.

The hinge 41 is disposed above the other hinge 42, hereinafter the former being referred to as "upper hinge" and the latter as "lower hinge". The casing 10 and the cover 20 are joined in an edge-to-edge relationship, and the two hinges 41 and 42 are aligned at an interval along the joint between the casing 10 and cover 20.

When the cover 20 is opened, the casing 10 and the cover 20 are expanded until they become flush with each other. When the cover 20 is closed, their inside surfaces are kept in face-to-face contact with each other. The cover 20 is provided with an entry key section 21 on the inside surface. The touch pen 30 is held by a holder 50 which includes a first holder 51 and a second holder 52 whereby a head 32 and a pen tip 31 of the touch pen 30 are retained, respectively.

Figure 2A:
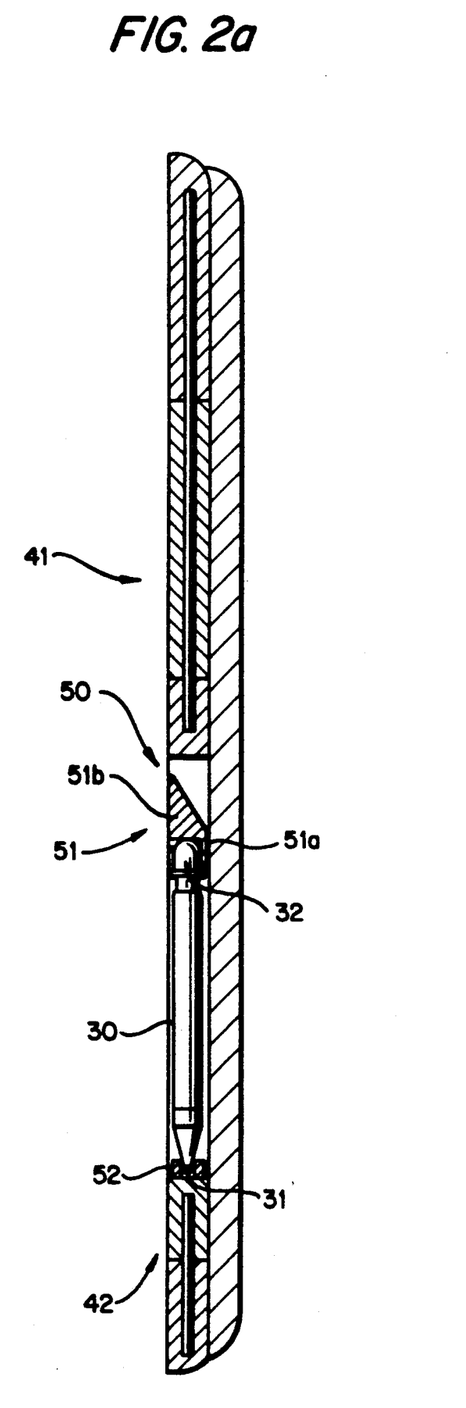
FIG. 2a is a cross-sectional view showing the pocket-size electronic device of FIG. 1.
Figure 2B:
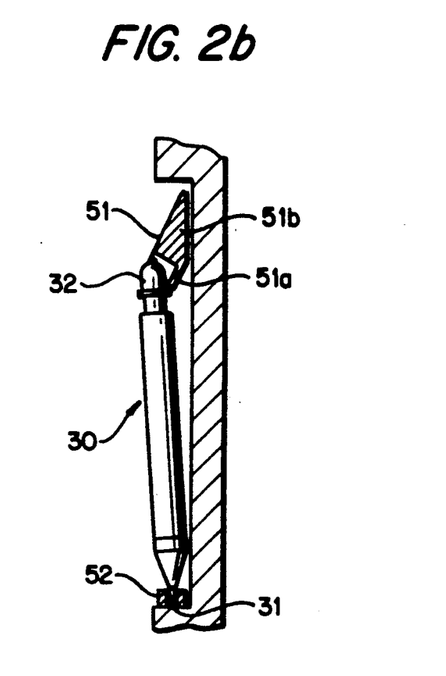
Figures 3, 4A, 4B, 5A, 5B:
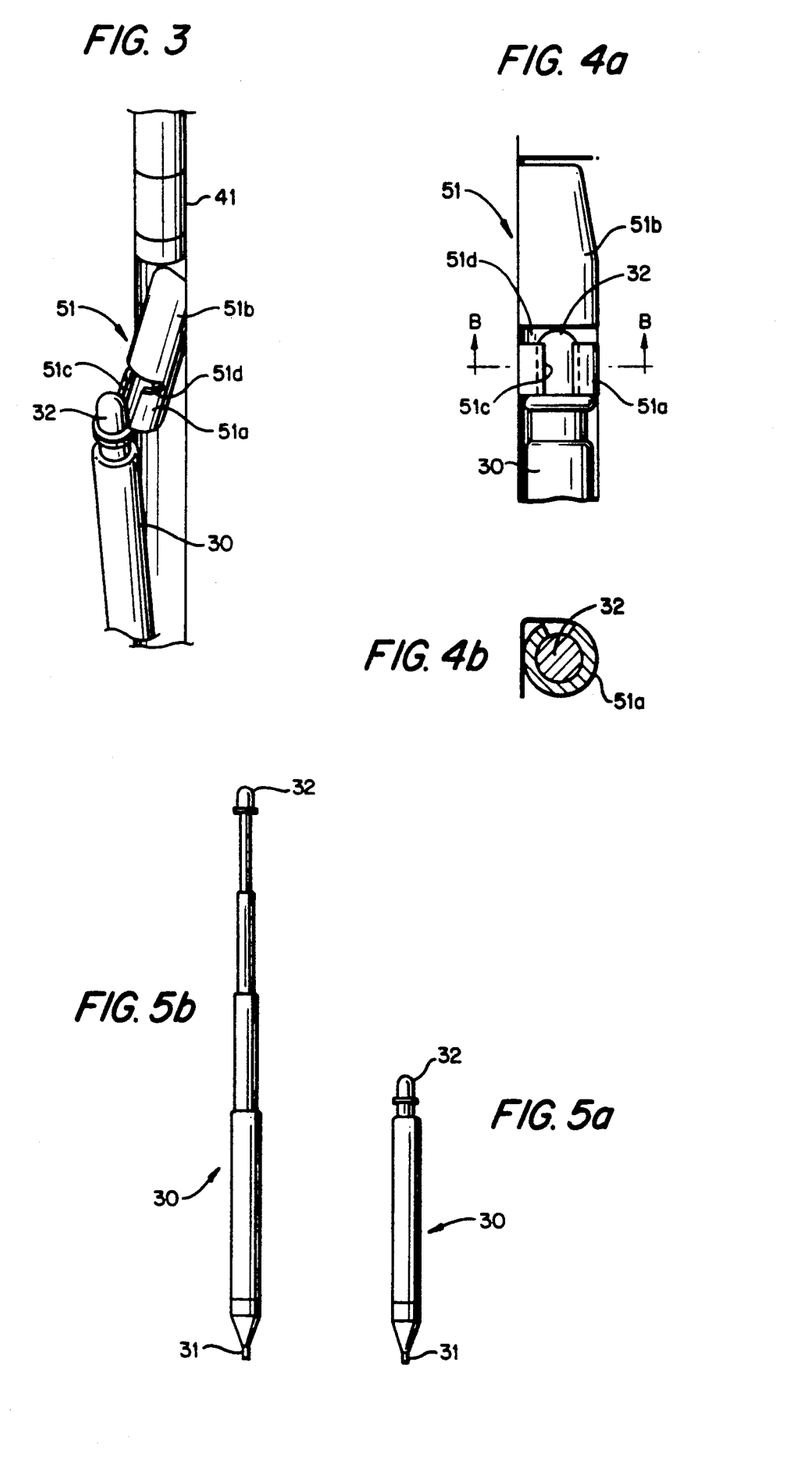

As shown in FIGS. 3, 4a, and 4b, the first holder 51 is rotatably supported along the hinged edges of the casing 10 and the cover 20. The first holder 51 includes a retainer section 51a having an axial slot 51c and a peripheral slot 51d in the form of the letter T. As shown in FIG. 2a, when the touch pen 30 is held by the first holder 51, it is completely housed, having no projecting part beyond the hinges 41 and 42. When the touch pen 30 is to be taken out from the first holder 51, the head 32 is pulled until it is removed from the retainer section 51a through the axial slot 51c. The first holder 51 includes a tapered portion 51b. The tapered portion 51b has a tapered face which can come into full contact with the surface of the casing 10 when the pen is pulled out as shown in FIG. 2b, thereby raising the first holder 51 beyond the hinges 41 and 42. Finally the head 32 of the touch pen 30 is released from the retainer section 51a through the axial slot 51c.

As shown in FIGS. 2a and 2b, the second holder 52 is fixed to the lower hinge 42 with a distance from the first holder 51 corresponding to the touch pen 30 in its contract state. The circumference of the second holder 52 is shorter than those of the upper and lower hinges 41 and 42 so that the periphery does not project beyond the peripheries of the hinges 41 and 42.

The touch pen 30 is telescopic as shown in FIGS. 5a and 5b, that is, it includes several sections that slide into each other so that the touch pen 30 can be made longer or shorter when it is used or not being used, respectively. The user pulls the touch pen 30 by the head 32. The touch pen 30 is held by the first holder 51 in its shortened state with the pen tip 31 housed in the second holder 52, and the head 32 housed in the retainer section 51a of the first holder 51. The head 32 is forced into the retainer section 51a through the axial slot 51c, wherein the head 32 is kept in full contact with the inside wall of the retainer section 51a.

As shown in FIG. 6, the control section 13 includes a CPU, a gate array, and the like, and is operated by the information stored in a ROM 14 that includes application programs such as a basic program for reading-out keys, a calendar, schedules, addresses, memory, calculating, and other fixed store such as a calendar.

The information written in the coordinate input section 11 is input to the control section 13. Terminals on the X side and Y side of the coordinate input section 11 are alternately connected to a constant voltage generator 11c and an A/D converter 11d by means of a selecting section 11b that is driven synchronously with the oscillation of an oscillator 11a. When the coordinate input section 11 is pressed, the pair of transparent electroconductive layers come into contact with each other, and the voltage at the constant voltage generator 11c is divided by the coordinate input section 11, and the divided voltage is converted into a digital signal by the A/D converter 11d. The digital signal is stored in an X register 11f and a Y register 11g by means of a switching section 11e that is also driven synchronously with the signals from the oscillator 11a.

The coordinate input section 11 is provided with a display window 18 in a layered state. The display window 18 is preferably made of a liquid crystal so that display can be effected by a relatively low power wherein picture elements are driven in response to signals from a common driver 18b and a segment driver 18a. The common driver 18b and segment driver 18a are controlled under a bit map 18c having bits corresponding to the picture elements of the display window 18. A bit in the bit map 18c is given a signal "0" when it corresponds to an inoperative picture element, and a bit is given a signal "1" when it corresponds to an operative picture element, wherein the information to be output by the control section 13 for display is decoded by a decoder 18d.

A signal can be also input to the control section 13 by operating a key in the input key section 12. In addition, a signal can be input to the control section 13 through the operation of a common entry key section 21 on the cover 20. The common entry key section 21 includes mode selection keys, an on/off key, various function keys, control indicating keys such as for operating a cursor, alphabets entry keys, number entry keys, etc.

Variable information for the application programs stored in the ROM 14 is stored in a main RAM 15 in which various memory function sections 15a to 15c are included so as to store names, addresses, telephone numbers, dates and contents of schedules, and various modes, respectively.

A subordinate RAM 16b is connected to the control section 13 through an image contracting section 16a. For example, the information input to the coordinate input section 11 by means of the touch pen is contracted by the contracting section 16a, and input to the subordinate RAM 16b.

When the memory card 60 is inserted in the casing 10, a terminal 61 of the memory card 60 is connected to a connector 17a in the casing 10. The connector 17a is connected to the control section 13 through an extension terminal 17b in exclusive use for the memory card 60. When the terminal 61 of the memory card 60 is connected to the connector 17a, it is detected by a detector 17c connected to the extension terminal 17b. The memory card 60 includes a ROM 62 storing application programs for enhancing the versatility of the device, a RAM 63 for storing information required for the ROM 62, and a battery 64 for backing up the information stored in the RAM 63.

The control section 13 is connected to a real-time clock (RTC) 19a designed to inform the control section 13 of the passage of time, and to a function expanding terminal 19b which can be connected to a printer or the like.

The common entry key section 21 includes keys whereby various modes can be selected such as a calendar mode, a telephone number mode, a schedule mode, a memory mode, and a hand-writing input mode.

When the calendar mode is selected, the calendar of a month corresponding to the date selected is displayed on the display window 18 of the casing 10.

When the telephone number mode is selected, the telephone number selected is displayed on the display window 18.

When the schedule mode is selected, the schedule from the present day up to the nearest future date is displayed on the display window 18.

When the memory mode is selected, the first memos stored in the memory function section 15c is displayed on the display window 18.

When the manual writing mode is selected, coordinates in the coordinate input section 11 touched by the touch pen 30 is detected, and the coordinates traced by the pen tip 31 are successively stored in the subordinate RAM 16b as image information, in a state contracted by the image contracting section 16a. Simultaneously, the dots in the display window 18 corresponding to the coordinates are lit one after another, and the trace drawn by the pen tip 31 is displayed on the display window 18.

The pocket-size electronic device has a limited space, and in order to make best use of the space, the cover 20 is fully opened around the hinges 41 and 42 so as to enable the coordinate input section 11 to be wide open when the device is used. When the manual writing mode is selected by operating the mode selecting key, the touch pen 30 is released from the pen holder 50. In this case, a tapered portion 51b of the first holder 51 is pressed so that the retainer section 51a is projected outward as shown in FIG. 3. The head 32 of the touch pen 30 is removed from the first holder 51 through the axial slot 51c, and the pen tip 31 is removed from the second holder 52.

In this way, after the touch pen 30 is removed from the first holder 51, it is extended as shown in FIG. 5b so as to be used in the extended state. The user can write the desired information in the coordinate input section 11. The written information is input to the subordinate RAM 16b.

When the touch pen 30 is not used, it is contracted, and the pen tip 31 is held by the second holder 52 and the head 32 is held by the first holder 51. In this case, the first holder 51 is pushed by the head 32 of the touch pen 30 until the head 32 is inserted in the retainer section 51a through the slot 51c, and at the same time, the first holder 51 is withdrawn to its original position. In this way the touch pen 30 is secured by the holder 50.

Since the touch pen 30 is completely housed in the holder 50 and the hinges 41 and 42, it does not obstruct the hinges 41 and 42 from rotation, or the cover 20 from closing over the casing 10.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A pocket-sized electronic device comprising a casing including a coordinate input section, a telescopic touch pen for inputting signals to the coordinate input section, a cover hinged to the casing by means of an upper hinge and a lower hinge disposed at a distance from each other and defining a space therebetween, a touch pen holder disposed in the space, the touch pen holder comprising a first holder member and a second holder member, one end of the touch pen being retained by the first holder member and the other end being retained by the second holder member.

2. A pocket-size electronic device according to claim 1, wherein the first holder member comprises a tapered face capable of being kept in full contact with the surface of the casing.

3. A pocket-size electronic device according to claim 1, wherein the casing comprises a liquid crystal display device.

4. A pocket-size electronic device according to claim 1, wherein the pocket-size electronic device is an electronic organizer.

5. A pocket-sized electronic device comprising: a casing including a coordinate input section; a touch pen for inputting signals to the coordinate input section; a cover hinged to the casing by spaced, coaxial upper and lower hinges; and touch pen holder means for holding the touch pen substantially coaxially with the upper and lower hinges.

6. The pocket-sized electronic device of claim 5, the touch pen holder means comprising a first holder member and a second holder member, one end of the touch pen being retained by the first holder member and the other end being retained by the second holder member.

7. The pocket-sized electronic device of claim 6, wherein the first holder member is rotatably mounted to facilitate insertion and removal of the touch pen.

* * * * *

UNITED STATES PATENT AND TRADEMARK OFFICE
CERTIFICATE OF CORRECTION

PATENT NO. : 5,179,502

DATED : January 12, 1993

INVENTOR(S) : Masaru Matsuda

It is certified that error appears in the above-identified patent and that said Letters Patent is hereby corrected as shown below:

<u>In the Drawings</u>:

Sheet 4, Figure 6, delete that portion of the line connecting "Oscillator" element 11a and "A/D" element 11d above the midpoint connection with the line to element 11e and insert a line running from said midpoint to "Selecting Section" element 11b.

Signed and Sealed this

Twenty-first Day of February, 1995

Attest:

Attesting Officer

BRUCE LEHMAN

Commissioner of Patents and Trademarks

FIG. 6